(No Model.)  2 Sheets—Sheet 1.

G. W. RICHARDSON.
DEVICE FOR CONVERTING MOTION.

No. 259,586.  Patented June 13, 1882.

Witnesses:
P. B. Turpin.
J. W. Wheat

Inventor:
George W. Richardson
By R. S. & A. P. Lacey
Attys.

(No Model.) 2 Sheets—Sheet 2.

G. W. RICHARDSON.
DEVICE FOR CONVERTING MOTION.

No. 259,586. Patented June 13, 1882.

Witnesses, Inventor:
P. B. Turpin. George W. Richardson
F. W. Wheat By R. S. & A. P. Lacey
Att'ys.

UNITED STATES PATENT OFFICE.

GEORGE W. RICHARDSON, OF MILTON, VERMONT.

DEVICE FOR CONVERTING MOTION.

SPECIFICATION forming part of Letters Patent No. 259,586, dated June 13, 1882.

Application filed March 10, 1882. (No model.)

*To all whom it may concern:*

Be it known that I, GEORGE W. RICHARDSON, a citizen of the United States, residing at Milton, in the county of Chittenden and State of Vermont, have invented certain new and useful Improvements in Converting Motion; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in machines for converting motion; and it consists in the construction and arrangement of the several parts, as will be hereinafter fully described, and pointed out in the claims.

Figure 1:
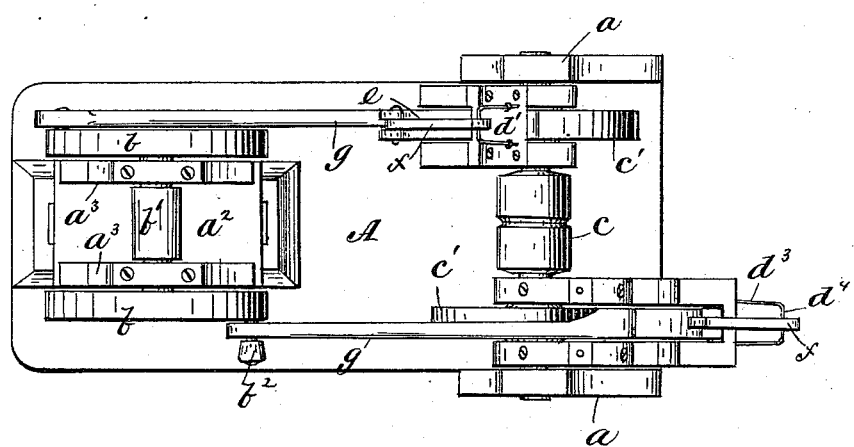
Figure 2:
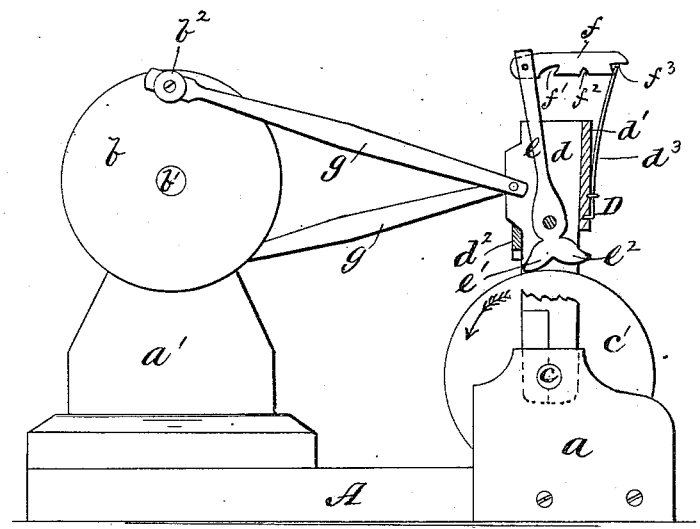
Figure 3:
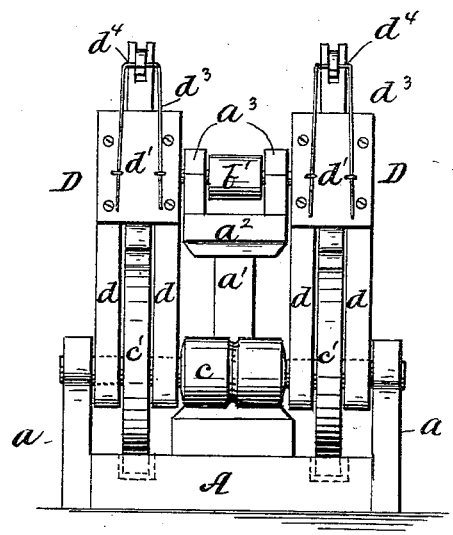

In the drawings, Figure 1 is a plan view, Fig. 2 is a side elevation, and Fig. 3 is an end elevation, of a machine constructed according to my invention; and in Fig. 4 I show a modification, as hereinafter described, and also a balance-wheel and a different mode of giving the horizontal motion.

A is the base of the supporting-frame of my machine. $a$ $a$ are side bars extended up from the sides of one end, while near the opposite end I fix the upright bar $a'$.

Upon the upright bar $a'$, I make fast the cross-piece $a^2$, to the top of which I secure the lugs $a^3$ $a^3$, within which I journal the shaft $b'$ of the wheels $b$, hereinafter described.

$c$ is the shaft to which it is desired to give rotary motion. It is journaled within and between the bars $a$ $a$, near the upper end of said bars.

$c'$ $c'$ are wheels, which I key or make fast in any other manner desired to the shaft $c$.

D is the pawl-post. It is composed of the side bars, $d$ $d$, the back bar, $d'$, and the front brace, $d^2$. The bars $d$ $d$ are journaled at their lower ends on the shaft $c$, one on either side of the wheel $c'$, and extend upward above the said wheels. The back board, $d'$, is secured to the rear sides of the bars $d^2$ above the wheel $c'$. I leave sufficient space between the lower end of the board $d'$ and the upper periphery of wheel $c'$ to permit the pawl hereinafter described to be moved freely, as shown.

$d^3$ is a spring formed the shape of a bail. Its arms are fixed to the back board, $d'$, and are extended above the top of the pawl-post, with its top piece, $d^4$, in proper position to engage the ratchets or notches in bar pivoted to top of pawl, as shown and hereinafter described.

$e$ is the pawl. It is journaled near its lower end on a pin fixed between the inner sides of the bars $d$.

It will be understood that the pawl-post need not necessarily be journaled on the axle on which is mounted the wheel $c'$. The framing may be so constructed that the pawl-post can be pivoted to it and have the same concentric movement with the wheel $c$ that it now has in the arrangement shown and described. This pawl $e$ is formed at its lower end with the double bearing-points $e'$ $e^2$. I slot the upper end of the pawl, and within the slot I pivot the end of a bar, $f$, the lower side of which I cut with notches or ratchets $f'$ $f^2$ $f^3$, arranged to be engaged by the top $d^4$ of spring $d^3$, as shown. When the spring is engaged in the notch $f^3$, as shown in Fig. 2, the bearing-point $e'$ will be pressed down on the periphery of the wheel $c'$, and the said wheel will be thrown forward, as indicated by arrow.

I have only described one pawl with post, spring-bearings, &c.; but it will be seen and understood that I employ two pawl-posts, one arranged over each wheel $c'$, and they operate together, as will be hereinafter described.

In Figs. 1, 2, and 3 I employ connecting-rods $g$, one end of which I pivot to the forward side of the pawl-posts, near the top of same, and extend forward and pivot to the wheels $b$. These wheels $b$ are fixed to the shaft $b'$. I pivot the end of the connecting-rods $g$ to the sides of these wheels oppositely to each other, and so that as the one connecting-rod is on the forward stroke the other is on the reverse stroke, giving the pawl-posts a reciprocating motion.

Motion may be communicated to the wheels $b$ by pulley-band or by crank-handle $b^2$, or in any other manner desired. It is often desirable to give the horizontal motion directly to the connecting-rods by connecting therewith piston-rod from cylinder, as shown in Fig. 4.

Figure 4:
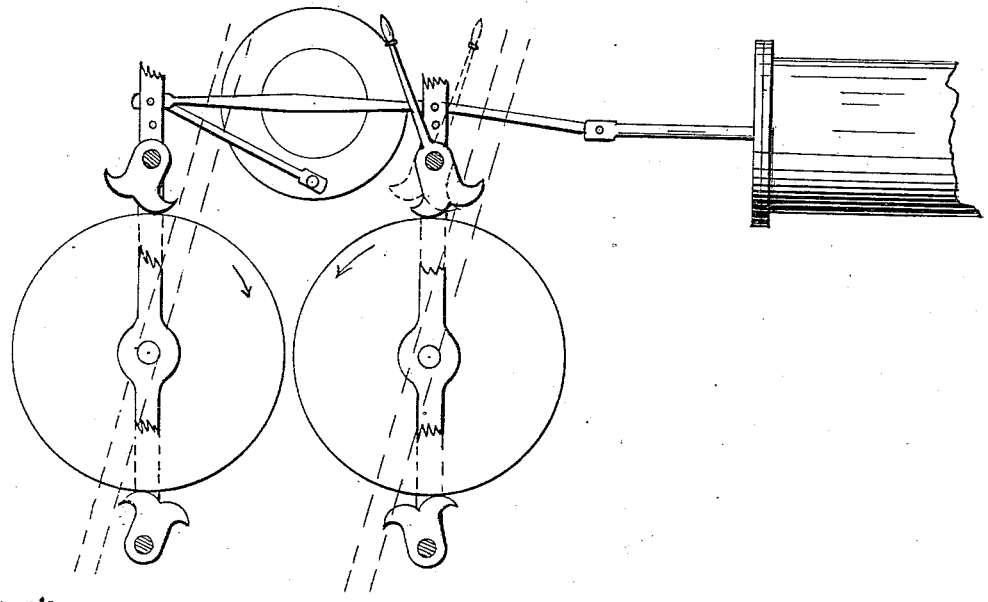

It is often beneficial to form the pawl-posts double by extending the bars $d$ on either side of the shaft $c$ and providing them with pawls $e$, bars $f$, spring $f^3$, as hereinafter described, and as illustrated in Fig. 4. This construction is beneficial in that it equalizes the strain or friction on the axle, and also the pawl on the under side of one wheel will aid the pawl on the upper side of the other wheel, and vice versa, in the operation of the device.

In Fig. 4 I also show a balance-wheel, which gives the right stroke and also secures a regularity of motion not otherwise attainable.

In the operation of my device I give reciprocating horizontal motion to the connecting-rods $g$ by means of their connection with the wheels $b$ or by means of connection with piston-rod, as desired.

The notch $f^3$ in bar $f$ is engaged by the spring $d^3$ on each of the pawl-posts, and the point $e'$ of pawl $e$ is held to the periphery of wheel $c'$, and motion, as indicated in arrow, Fig. 2, will be given to said wheel. It will be understood that the pawls in each of the upper posts are arranged with the same bearing-points on the wheels on which they respectively bear. Then, as the posts D have a reciprocating rocking motion, as the one pawl is carrying the wheel forward, as indicated, the other is slipping back on the periphery of the wheel on which it bears, and as the one pawl finishes its working motion (which is the forward one when the pawls are in the position shown in Fig. 2) the other pawl will be back and ready to begin its work. When the spring $f^3$ engages the notches $f^2$ the pawl is held clear of the periphery of the wheel. When the spring engages the notch $f'$ of bar $f$ the point $e^2$ of pawl bears on the periphery of the wheel $c'$, and the opposite motion to that indicated in Fig. 2 will be given the said wheel.

It will be seen that the spring $d^3$ holds the point steadily to the periphery of the wheel on the working stroke of the device, and yet permits it to slide easily on the periphery on the return-stroke or will hold the said pawl clear of the wheel, as desired.

Having thus described my invention, what I claim, and desire to secure by Letters Patent, is—

1. The combination, substantially as hereinbefore set forth, of the wheel $c'$, the pawl-post D, pivoted and swinging concentrically with the wheel, and the pawl pivoted in the pawl-post and swinging therewith, and constructed with the points $e'$ $e^2$, and means whereby the said pawl is held with either of the said points bearing on or clear of the periphery of the said wheel, as and for the purposes described.

2. The combination, substantially as hereinbefore set forth, of the wheel $c'$, the pawl $e$, pivoted in a frame rocking on the shaft of the said wheel, and constructed with the points $e'$ $e^2$, and means whereby the said pawl may be held with one or the other of the said points $e'$ $e^2$ bearing on the periphery of the wheel $c'$, as and for the purposes described.

3. The combination, with the shaft $c$ and wheel $c'$, of the pawl-post D, the double-pointed pawl $e$, pivoted between the bars of said post, bar $f$, pivoted to the upper end of pawl $e$ and provided with notches $f'$ $f^2$ $f^3$, and spring $d^3$, having one of its ends fixed to the back board, $d'$, and its opposite end arranged to engage the notches in bar $f$, substantially as and for the purposes set forth.

In testimony whereof I affix my signature, in presence of two witnesses, on this 20th day of February, 1882.

GEORGE W. RICHARDSON.

Witnesses:
PORTIUS C. DEMING,
HOMER E. POWELL.